United States Patent
Takagi

(10) Patent No.: US 7,224,511 B2
(45) Date of Patent: May 29, 2007

(54) ELECTROPHORETIC DISPLAY DEVICE

(75) Inventor: Shinya Takagi, Atsugi (JP)

(73) Assignee: Canon Kabushiki Kaisha, Tokyo (JP)

(*) Notice: Subject to any disclaimer, the term of this patent is extended or adjusted under 35 U.S.C. 154(b) by 14 days.

(21) Appl. No.: 11/105,292

(22) Filed: Apr. 7, 2005

(65) Prior Publication Data

US 2005/0237599 A1    Oct. 27, 2005

(51) Int. Cl.
- *G02B 26/00* (2006.01)
- *G09G 3/34* (2006.01)
- *G03G 17/04* (2006.01)

(52) U.S. Cl. ............... 359/296; 345/107; 430/32
(58) Field of Classification Search ........... 359/296; 345/107; 204/450, 600; 430/32, 38
See application file for complete search history.

(56) References Cited

U.S. PATENT DOCUMENTS

| | | | |
|---|---|---|---|
| 6,590,696 B2 | 7/2003 | Yanagisawa et al. | 359/296 |
| 2001/0055000 A1 | 12/2001 | Kanae, et al. | 345/107 |
| 2003/0227665 A1 | 12/2003 | Kawai | 359/296 |

FOREIGN PATENT DOCUMENTS

| | | | |
|---|---|---|---|
| JP | 62079468 A | * | 4/1987 |
| JP | 01-086116 | | 3/1989 |
| JP | 02-024633 | | 1/1990 |
| JP | 02-189525 | | 7/1990 |
| JP | 03-249736 | | 11/1991 |
| JP | 03-249737 | | 11/1991 |
| JP | 03-249738 | | 11/1991 |
| JP | 03-249739 | | 11/1991 |
| JP | 04-166918 | | 6/1992 |
| JP | 09-185087 | | 7/1997 |
| JP | 2000-0227612 | | 8/2000 |

* cited by examiner

*Primary Examiner*—Ricky Mack
*Assistant Examiner*—William Choi
(74) *Attorney, Agent, or Firm*—Fitzpatrick, Cella, Harper & Scinto

(57) ABSTRACT

An electrophoretic display device includes a substrate, an electrode formed on a surface of the substrate, and a liquid which contains charged particles and is held on the substrate. Each of the charged particles includes pigment particles, a coating material for coating the pigment particles, and a resinous material containing a plurality of pigment particles coated with the coating material. The liquid contains a charge control agent for electrically charging the resinous material.

7 Claims, 4 Drawing Sheets

(a)        (b)

ELECTROPHORETIC DISPLAY DEVICE

TECHNICAL FIELD

The present invention relates to an electrophoretic display device for effecting display by moving charged particles (electrophoretic particles) between electrodes and a dispersing liquid for electrophoretic display.

BACKGROUND ART

In recent years, with development of information equipment, the needs for low-power and thin display apparatus have grown, so that extensive study and development have been made on display apparatuses fitted to these needs. Of these display apparatuses, a liquid crystal display apparatus has been developed actively as a display apparatus capable of meeting the needs by electrically controlling alignment of liquid crystal molecules to change optical characteristics-of the liquid crystal and has been brought into the commercial stage.

From the viewpoints of low power consumption and alleviation of eyestrain, reflection-type display apparatuses, an electrophoretic display device wherein charged particles dispersed in an insulating solvent are moved between electrodes to effect display, has been proposed in Japanese Laid-Open Patent Application (JP-A) Hei 9-185087 and Japanese Patent No. 2551783.

As basic drive schemes of the electrophoretic display device, a scheme wherein charged particles (electrophoretic particles) are moved in a horizontal direction as shown in FIG. 1 and a scheme wherein charged particles are moved in a vertical direction as shown in FIG. 2, have been proposed. In either of these schemes, a dispersion liquid comprising charged particles and a dispersion medium is used as a display medium. Further, there has been also provided an electrophoretic display device using microcapsules each containing charged particles and a dispersion medium as a display medium as shown in FIG. 3.

In the respective structures of these electrophoretic display devices, electrophoretic particles are moved depending on a charge polarity of the electrophoretic particles and a polarity of a voltage applied to both electrodes. As a result, different states in position of the electrophoretic particles are optically recognized to cause a contrast.

In the electrophoretic display devices, stable control of migration of the charged electrophoretic particles is important for display performances in terms of a high contrast and durability performances.

With respect to the electrophoretic particles for use in the electrophoretic display devices, JP-A Hei 3-249736, JP-A Hei 3-249737, JP-A Hei 3-249738, JP-A Hei 3-249739, and JP-A Hei 4-166918 have been proposed. Further, U.S. Pat. No. 6,590,696 has been proposed with respect to the dispersion liquid.

However, in the conventional electrophoretic display devices, chargeability and dispersibility of the electrophoretic particles are insufficient, so that these arises such a problem that a stable image cannot be retained.

DISCLOSURE OF THE INVENTION

The present invention has accomplished in view of the above-mentioned problem of the conventional electrophoretic display devices.

An object of the present invention is to provide an electrophoretic display device capable of stabilizing charging of electrophoretic particles and maintaining a high contrast image display state from immediately after voltage application.

Another object of the present invention is to provide a dispersion liquid, for electrophoretic display, to be used in the electrophoretic display device.

According to the present invention, there is provided an electrophoretic display device, comprising:

a substrate, an electrode formed on a surface of said substrate, and a liquid which contains charged particles and is held on said substrate; each of the charged particles comprising pigment particles, a coating material for coating the pigment particles, and a resinous material containing a plurality of pigment particles coated with the coating material, wherein said liquid contains a charge control agent for electrically charging the resinous material.

According to the present invention, there is also provided a dispersion liquid, for electrophoretic display, employed in the electrophoretic display device.

BEST MODE FOR CARRYING OUT THE INVENTION

Hereinbelow, the present invention will be described more specifically with reference to the drawings.

Embodiments of the electrophoretic display device according to the present invention will be described with reference to FIGS. 1-5, which are views each showing an embodiment of the electrophoretic display device or electrophoretic particle according to the present invention for convenience.

Figure 1:
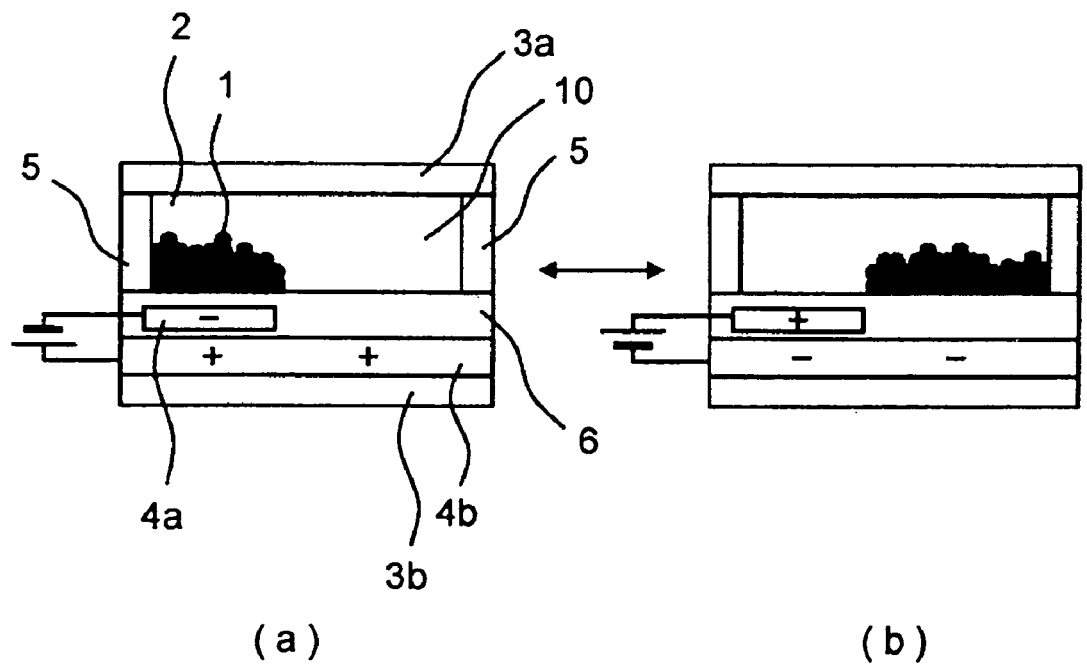
FIGS. 1(a) and 1(b) are schematic views showing an embodiment of a structure of the electrophoretic display device according to the present invention.
Figure 2:
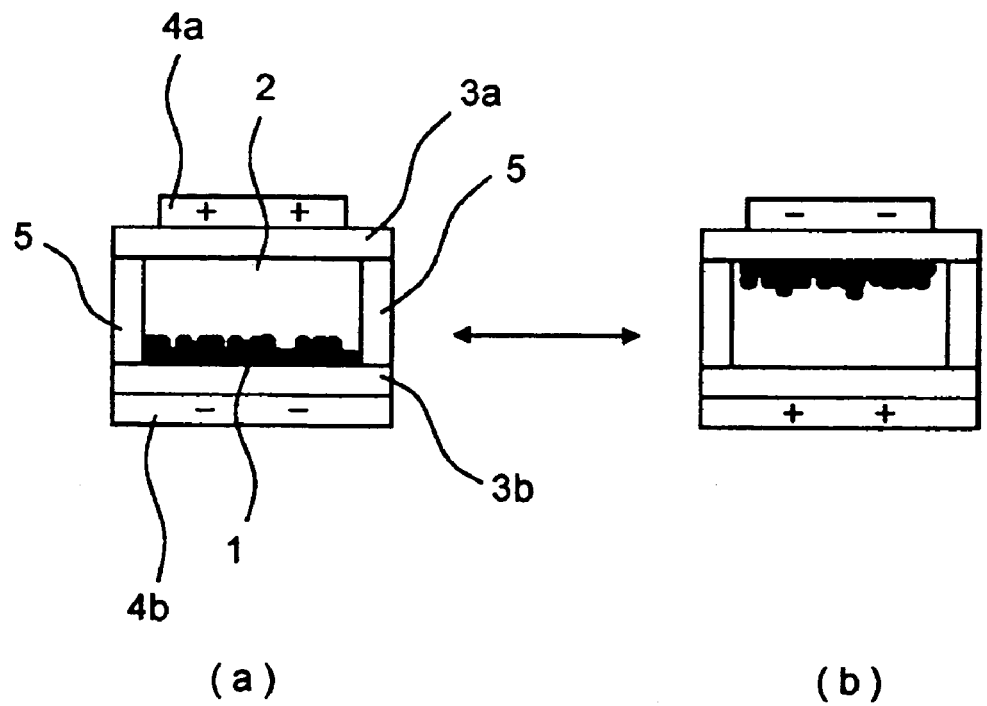
FIGS. 2(a) and 2(b) are schematic views showing another embodiment of the electrophoretic display device of the present invention.

FIG. 1 shows an embodiment of a structure of the electrophoretic display device of the present invention, and FIG. 2 shows another embodiment of a structure of the electrophoretic display device of the present invention. In these Figures, electrophoretic particles are positively charged electrically.

The present invention includes an electrophoretic display device wherein electrophoretic particles are horizontally moved (FIG. 1) and an electrophoretic display device wherein electrophoretic particles are vertically moved (FIG. 2).

As shown in FIG. 1, the horizontal movement type electrophoretic display device has such a structure that both of a first electrode 4a and a second electrode 4b are disposed along any one of a pair of substrates 3a and 3b so that electrophoretic particles 1 are moved horizontally along the substrates 3a and 3b.

On the other hand, the vertical movement type electrophoretic display device as shown in FIG. 2 has such a structure that a first electrode 4a and a second electrode 4b are separately disposed on a first substrate 3a and a second substrate 3b, respectively, so that electrophoretic particles 1 are moved vertically (perpendicularly) to the substrates 3a and 3b.

Hereinbelow, the electrophoretic display device of the present invention will be explained based on the horizontal movement type electrophoretic display device (FIG. 1) as an example.

As shown in FIG. 1, the electrophoretic display device according to this embodiment includes a dispersion liquid 10 comprising a plurality of charged particles (electrophoretic particles) 1 and a liquid in which the electrophoretic particles 1 are dispersed, i.e., a dispersion medium 2. In the electrophoretic display device, a voltage is applied between the first and second electrodes 4a and 4b to move the electrophoretic particles 1 to display an image.

Figure 5:
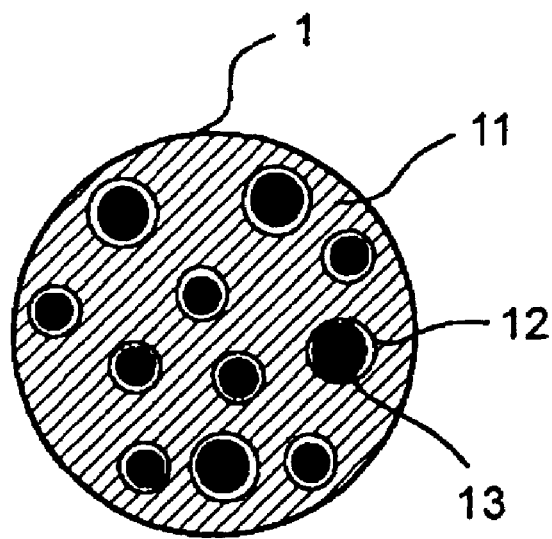
FIG. 5 is a schematic view showing an electrophoretic particle used in the electrophoretic display device according to the present invention.

FIG. 5 shows each electrophoretic particle used in this embodiment. An electrophoretic particle 1 includes a plurality of pigment particles 13 coated with a coating material 12 and a resinous material 11 for forming an outer shape thereof. The coating material 12 and the resinous material 11 are formed of a polymeric material (A) and a polymeric material (B), respectively, described hereinafter.

A coloring density of the electrophoretic particles is controlled by the number of pigment particles 13 contained in each electrophoretic particle 1.

The pigment particles 13 are disposed inside the resinous material 11 but may be exposed to the surface of the resinous material 11. The pigment particles 13 are coated with the coating material 12 so as not to directly contact the dispersion medium 2 even if the pigment particles 13 are exposed to the surface of the resinous material 11. More specifically, the pigment particles 13 are preliminarily coated with the coating material 12 at the time of forming each electrophoretic particle 1 by mixing the pigment particles 13 with the resinous material 11.

Figure 6:
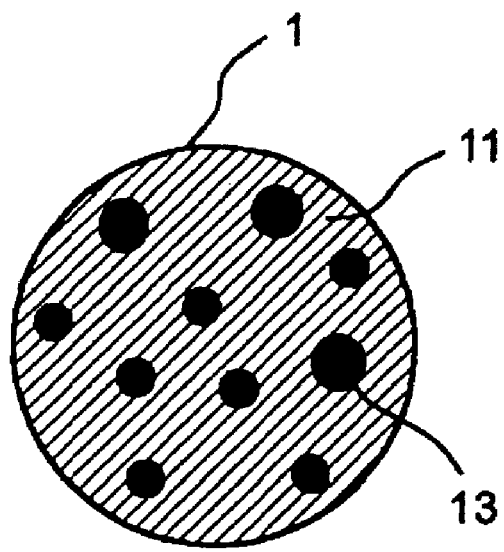
FIG. 6 is a schematic view showing a comparative electrophoretic particle.

FIG. 6 shows a comparative electrophoretic particle 1 including a plurality of pigment particles 13 which are not coated with a coating material. In such a case where the surfaces of the pigment particles 13 are not coated with the coating material, electrophoretic particles 1 are not moved quickly immediately after voltage application or a charging state thereof becomes unstable to disable drive of the electrophoretic display device, as a result of experiment by the inventor. This may be attributable to some kind of interaction of a charge control agent contained in the dispersion medium with the pigment particles 13 exposed at the surface of the electrophoretic particle 1, causing a lowering in a charge imparting effect to the resinous material 11.

Further, in the case where inorganic pigment particle 13 coated with a polymeric material are used as the electrophoretic particles 1 as they are without using the resinous material 11, the resultant electrophoretic particles 1 are liable to be attached to the electrode. Accordingly, the resinous material 11 has an effect of improving a dispersibility in the dispersion medium 2 while enclosing therein a plurality of the pigment particles 13.

In the case where the charge control agent is not contained in the dispersion medium 2, the electrophoretic particles 1 are not charged or charged unstably. As a result, the electrophoretic particles are not moved or unstably moved even at the time of application of electric field.

The kind of pigment for the pigment particle 13 used in the present invention may be determined depending on a display mode of the electrophoretic display device used. Examples of the pigment particle 13 may include particles of inorganic materials, such as white lead, zinc oxide, lithophone, titanium dioxide, zinc sulfide, antimony oxide, calcium carbonate, kaoline, mica, barium sulfate, glass white, alumina white, talc, silica, calcium silicate, cadmium yellow, cadmium lipotone yellow, yellow oxide, titanium yellow, titanium barium yellow, cadmium orange, cadmium lipotone organic, molybdate orange, iron red, minium, vermilion, cadmium red, cadmium lipotone red, umber, brown iron oxide, galvanized iron chrome brown, chrome green, chrome oxide, viridian, cobalt green, cobalt chrome green, titanium cobalt green, iron blue, cobalt blue, ultramarine, cerulean blue, cobalt aluminum chrome blue, cobalt violet, mineral violet, carbon black, iron black, manganese ferrite black, cobalt ferrite black, copper chrome black, copper chrome manganese black, black low-level titanium oxide, aluminum powder, copper powder, lead powder, tin powder, and zinc powder.

A particle size and a shape of these inorganic pigment particles can be controlled through a known pulverization process, a known particle formation process, etc.

Of these inorganic pigments, carbon black is preferred for coloring the electrophoretic particles black and titanium oxide is preferred for coloring the electrophoretic particles white.

In the present invention, the pigment particles 13 may preferably have an average particle size of 0.005-0.5 µm, more preferably 0.005-0.1 µm. Below 0.005 µm, handling properties are remarkably lowered. Above 0.5 µm, a particle size of the resultant electrophoretic particles becomes too large. The shape of the inorganic pigment particles may be spherical or nonspherical.

As a material for the coating material for coating the surface of the pigment particles, a polymeric material (A) is suitable.

Examples of the polymeric material (A) may include a polystyrene comprising styrene and divinylbenzene as monomer units; a poly(meth)acrylate comprising at least one species of acrylic acid, acrylate, methacrylic acid and methacrylate as a monomer unit; a styrene-(meth)acrylate copolymer; a polycarbonate; a polyalylate; a polyethylate; a polypropyrene; and a polyolefin of norbornene resin having a norbornene ring.

Of these polymeric materials, from viewpoints of ease of coating and adhesive properties with respect to the inorganic pigment particles, the polystyrene, the poly(meth)acrylate, the styrene-(meth)acrylate copolymer, the polycarbonate, and the polyolefin may preferably be used. These polymeric materials may be used singly or in combination of two or more species.

Coating of the surface of the pigment particles comprising the inorganic pigment described above with the above described polymeric material (A) may be effected through known processes including:

(1) a coating method using a spray drier, (2) a precipitation/granulation method wherein inorganic pigment particles are dispersed in a system comprising the polymeric material (A) dissolved i a poor solvent at high temperature and are coated with the polymeric material (A) at their outermost surfaces by cooling the system to lower temperature, and (3) a coating method wherein the polymeric material (A) is prepared through seed polymerization using the inorganic pigment particles as seed particles.

The coating material 12 may preferably be formed in a film having a thickness of 0.001-0.2 μm.

As the resinous material 11, it is preferred to use a material, which is excellent in chargeability to the charge control agent described later and is insoluble in the dispersion medium, such as a polymeric material (B).

Examples of the polymeric material (B) as the resinous material 11 may include a polyester, a polystyrene, a poly(meth)acrylate, a styrene-(meth)acrylate copolymer, a polycarbonate, a polyalylate, a polyacrylonitrile, a polyurea, a nylon polymer, an urethane polymer, and a melamine polymer. These polymeric materials may be used singly or in combination of two or more species.

Of these polymeric materials, the polystyrene, the poly(meth)acrylate or the styrene-(meth)acrylate copolymer are preferred in terms of excellent dispersibility in the dispersion medium.

If the above mentioned conditions are satisfied, the polymeric material (B) for the resinous material 11 may be identical to the polymeric material (A) for the coating material 12.

The polymeric material (B) may also used after being subjected to crosslinking treatment for insolubilization in the solvent.

The electrophoretic particles used in the present invention may be prepared through, e.g., such a polymerization that inorganic pigment particles surface-coated with a polymeric material (A) are dispersed in a monomer for a polymeric material (B), followed by polymerization. The polymerization may be known processes, such as emulsion polymerization, dispersion polymerization, suspension polymerization, and seed polymerization.

Further, the electrophoretic particles may be prepared through a precipitation/granulation process wherein inorganic pigment particles coated with a polymeric material (A) are dispersed in a solution of a polymeric material (B) in a good solvent and thereafter a solubility of the polymeric material (B) is changed by, e.g., removing the solvent, replacing the solvent with a poor solvent, or lowering the reaction temperature, to obtain particles.

Further, it is possible to use a pulverization/granulation process wherein inorganic pigment particles coated with a polymeric material (A) are melt-kneaded with a polymeric material (B) at a predetermined temperature (not more than a melting temperature of the polymeric material (A)) and then the kneaded product is pulverized to obtain particles.

The thus prepared electrophoretic particles may be dyed with a dye, as desired, in order to adjust a degree of coloring.

Examples of a stain used as the dye may include oil-soluble dyes, such as Valifast Red, Valifast Yellow, Oplas Red, Oil Scarlet (mfd. by Orient Kagaku K.K.); Oil Blue V, Oil Green, Bright Green, Sudan IV, Sudan III (mfd. by Daiwa Kakou K.K.); Sumiplast Blue, Sumiplast Red HFG, Sumiplast Red HF4G, Sumiplast Yellow, Whiteflour B (mfd. by Sumitomo Kagaku Kogyo K.K.); Macrolex Red GS (mfd. by Bayer Japan Co.); Microlis Blue, Microlis Green (mfd. by Ciba-Geigy Japan Lad.); and dyes, such as Orient Oil Black (mfd. by Orient Kagaku K.K.); Sumikaron Brilliant Blue, Sumikaron Violet (mfd. by Sumitomo Kagaku Kogyo K.K.); Kayacryl Black, Kayalon Polyester Blue, Kayaron Polyester Red (mfd. by Nippon Kayaku K.K.).

In the present invention, it is possible to use two or more species of electrophoretic particles 1 different in particle size, particle component or coloring, depending on a display mode of the electrophoretic display device.

The electrophoretic particles 1 may be used in an arbitrary weight ratio per the dispersion liquid 2, preferably in the range of 0.1-20 wt. parts per 100 wt. parts of the dispersion liquid 2.

As the dispersion medium 2 for dispersing the electrophoretic particles 1 used in the present invention, it is possible to use a high insulative organic solvent having a low electroconductivity. Examples of the dispersion medium 2 may include: aromatic hydrocarbon solvents, such as benzene, ethylbenzene, dodecylbenzene, toluene, xylene, and naphthene-based hydrocarbon; aliphatic hydrocarbon solvents, such as paraffin-based hydrocarbon solvents (e.g., hexane, cyclohexane and kerosine) and isoparaffin-based hydrocarbon solvents, halogenated hydrocarbon solvents, such as chloroform, trichloroethylene, tetrachloroethylene, dichloromethane, trichlorotrifluoroethylene, and ethyl bromide; silicone oil; and high-purity petroleum.

Of these organic solvents, the aliphatic hydrocarbon solvents may preferably be used. Examples thereof may include Isoper G, H, M, L, P and V (mfd. by Exxon Corp.); Shellsol (mfd. by Showa Shell Japan K.K.); IP Solvent 1016, 1620, 2028, and 2835 (mfd. by Idemitsu Sekiyu Kagaku K.K.); and Nisseki Isosal 200, 300 (mfd. by Nippon Sekiyu Kagaku K.K.). These may be used singly or in mixture of two or more species.

In the present invention, the dispersion medium 2 contains a charge control agent which is soluble in the dispersion medium and suitable for charging the above described polymeric material (B). The charge control agent may be known charge control agents, including: metallic soaps inclusive of naphthenic acid-based metallic soaps, such as cobalt naphthenate, zirconium naphthenate, copper naphthenate, iron naphthenate, lead naphthenate; octenic acid-based metallic soaps, such as cobalt octenate, zirconium octenate, iron octenate, lead octenate, nickel octenate, manganese octenate, and zinc octenate; and other known charge control agents, such as polyaminopolybutylsuccinimide and lecitin. Of these charge control, agents metallic soaps may preferably be used.

The charge control agents may be contained in the dispersion medium 2 in an appropriate amount, preferably 0.0001-5 wt. parts, more preferably 0.001-1 wt. part, per 100 wt. parts of the dispersion medium 2.

The dispersion medium 2 may further contain a rosin ester or a rosin derivative as an aid for the charge control agent. The rosin ester or rosin derivative is not particularly limited so long as it is soluble in the dispersion liquid 2. Examples thereof may include: gum rosin, wood rosin, tall oil rosin, rosin-modified maleic acid, rosin-modified pentaerythritol, rosin glycerinate, partially hydrogenated rosin methylate, partially hydrogenated rosin glycerinate, partially hydrogenated rosin triethyleneglycol ester, completely hydrogenated rosin pentaerythritol ester, maleic acid-modified rosin ester, fumaric acid-modified rosin ester, acrylic acid-modified rosin ester, maleic-acid-modified rosin pentaerythritol ester, fumaric acid-modified pentaerythritol ester, acrylic acid-modified rosin pentaerythritol ester, maleic acid-modified rosin glycerinate, fumaric acid-modified rosin glycerinate, and acrylic acid-modified rosin glycerinate.

A polymer (resin) soluble in the dispersion medium 2 can be used and contained the dispersion medium 2 as a dispersion stabilizer.

Examples of the dispersion stabilizer may include polybutadiene, polyisoprene, polyisobutyrene, polybutene, styrene-butadiene copolymer, styrene-isoprene copolymer, styrene-maleic anhydride, norbornene resin, and polyethylene wax.

Of these polymers or resins, styrene-butadiene copolymer may preferably be used, and commercially available examples thereof may include: E-SBR, S-SBR (mfd. by JSR K.K.); NIPOL 1502, NIPOL 1712, NIPOL NS112, NIPOL NS116, NIPOL 1002, NIPOL 1009 (mfd. by Nippon Zeon K.K.); Tufdene, Tufprene, Asaprene (mfd. by Asahi Kasei K.K.); Sumitomo SBR (mfd. by Sumitomo Kagaku K.K.). These polymers (resins) may be used singly or in mixture of two or more species.

In the dispersion medium 2, one or two or more species of surfactants, which are soluble in the dispersion medium 2, may be contained, as desired. Examples of the surfactant may include anionic surfactant, cationic surfactant, amphoteric surfactant, nonionic surfactant, and fluorine-containing surfactant.

The dispersion medium 2 may be colored a color different from that of the electrophoretic particles, depending on a display mode of the electrophoretic display device. A colorant for that purpose is not particularly restricted so long as it is an oil-soluble dye which can be dissolved in the dispersion medium 2.

Figure 3:
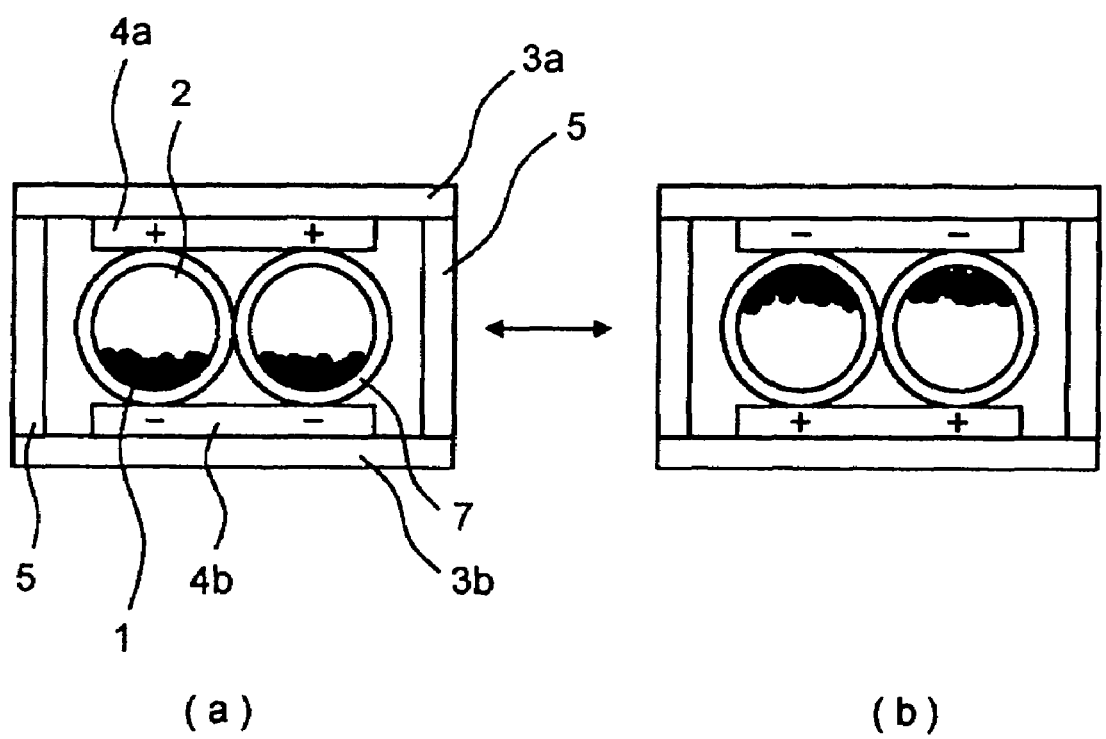
FIGS. 3(a) and 3(b) are schematic views showing another embodiment of the electrophoretic display device of the present invention.
Figure 4:
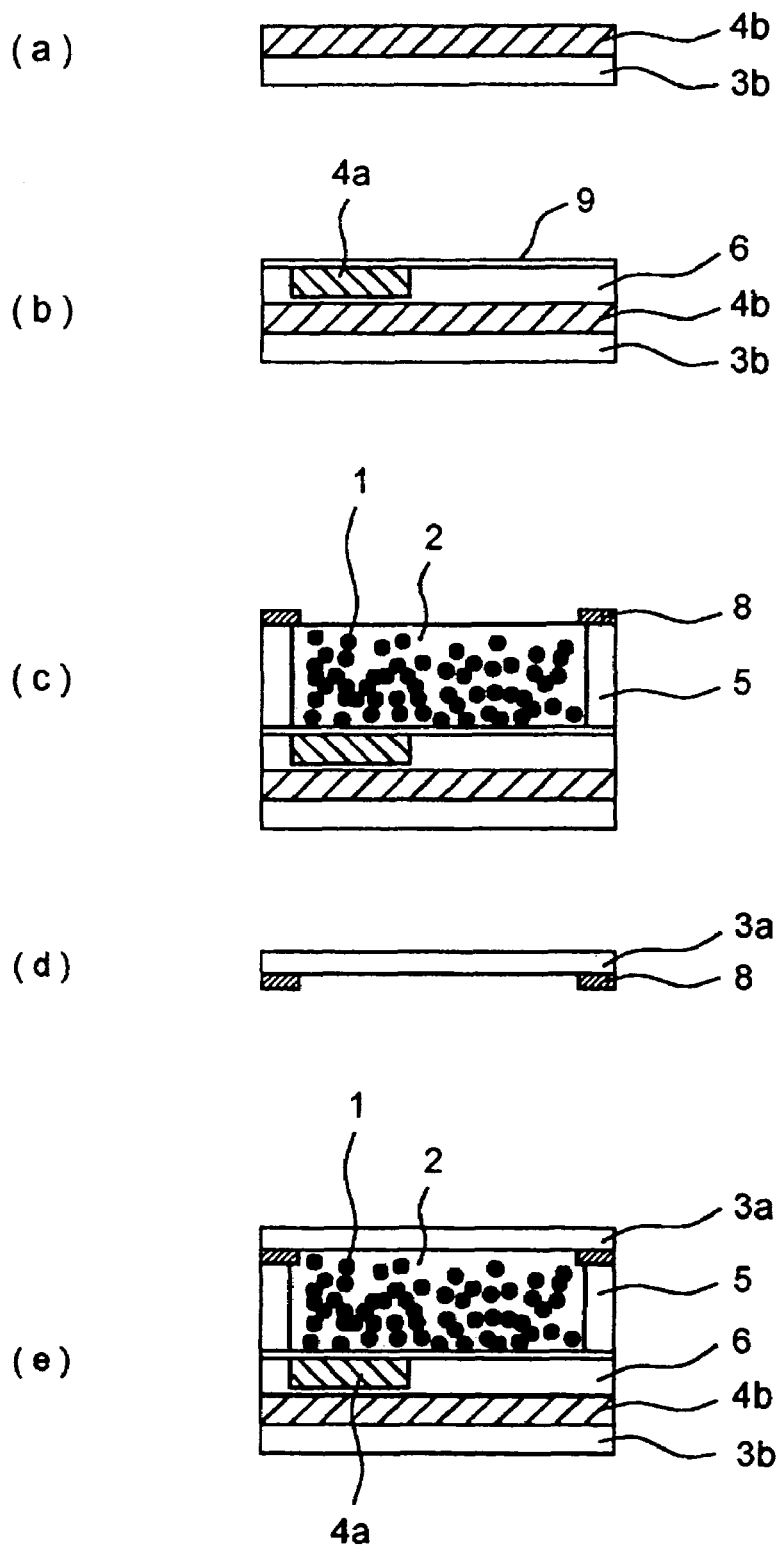
FIGS. 4(a) to 4(e) are schematic views for illustrating a process for producing the electrophoretic display device of the present invention.

The dispersion liquid for electrophoretic display, containing the electrophoretic particle 1 and the dispersion medium 2 can be used and encapsulated in microcapsule 7 as shown in FIG. 3. Encapsulation of the dispersion liquid in the microcapsule can be performed through an ordinary process, such as in-situ polymerization, interfacial polymerization or coacervation.

As a wall material for the microcapsule 7, it is possible to use polyurethane, polyurea, polyurea-polyurethane, urea-formaldehyde resin, melamine-formaldehyde resin, polyamide, polyester, polysulfoneamide, polycarbonate, polysulfinate, epoxy resin, polyacrylate, polymethacrylate, polyvinyl acetate, polyvinyl alcohol, gelatin, etc.

Each microcapsule 7 may have a size (diameter) of 1-500 µm, preferably 20-100 µm.

Next, the electrophoretic display device of the present invention will be described with reference to FIG. 1.

Referring to FIG. 1, an electrophoretic display device includes a pair of substrates 3a and 3b which can be formed of, e.g., polymer films such as films of polyethylene terephthalate (PET), polyether sulfone (PES), polyimide (PI), polyethylene naphthalate (PEN), and polycarbonate (PC); inorganic materials such as glass and quartz; and a stainless substrate having a surface insulating layer.

As the substrate 3a to be disposed on a viewer side, a material, which has a high transparency to visible light, such as a transparent polymer film or glass. At a surface, contacting the dispersion liquid, of the substrate 3a, a polymeric material having a rubber hardness in the range of 10-90 degrees may be disposed. Examples of the polymeric material may include silicone resin, natural rubber and thermoplastic elastomer (resin).

For the electrodes 4a and 4b, an electroconductive material which can be patterned may be used Examples thereof may include indium tin oxide (ITO), aluminum and titanium.

In the horizontal movement type electrophoretic display device shown in FIG. 1, one (4b) of the electrodes 4a and 4b is formed on the entire pixel and the other electrode 4a is formed partially on the pixel at a level different from the electrode 4b so as to overlap the electrode 4b. These electrodes 4a and 4b, however, may be formed at the same level. In these case, the electrode 4b is not formed on the entire pixel and these electrodes 4a and 4b do not overlap each other. Further, a plurality of electrodes may be divided and formed on pixels on a pixel by pixel basis.

An insulating layer 6 may be formed so as to cover the electrodes 4a and 4b, thus preventing charge injection from the electrodes 4a and 4b into the electrophoretic particles 1. As a material for the insulating layer 6, it is preferred to use a film which less causes pinhole. Examples thereof may include a high transparent resin, such as polyimide, polyester, polyacrylate, polymethacrylate, polycarbonate, polyalylate, novalac resin, and epoxy resin.

A partition wall 5 may be formed through, e.g., a method wherein a photosensitive resin layer is applied, followed by exposure to light and wet development; a printing method; a method wherein a partition wall member is separately prepared and bonded to the substrate; or a method wherein a partition wall is formed on the surface of the light-transmissive substrate through molding.

In the case of the horizontal movement type electrophoretic display device, an area in which one of the first and second electrodes 4a and 4b described above is disposed can be colored the same color as the electrophoretic particles 1 and another area in which the other electrode is disposed can be colored a color different from the color of the above-mentioned area. In this case, the electrodes per se can be colored. Alternatively, a coloring layer may be disposed separately from the electrodes, or a colored insulating layer may be disposed so as to overlap the electrodes.

In the case of the vertical movement type electrophoretic display device, the dispersion medium 2 for dispersing the electrophoretic particles 1 can be colored a color different from that of the electrophoretic particles 1. As a result, it becomes possible to effect two-color display. By effecting such a display that different colors are displayed at adjacent pixels, it is also possible to effect a color display as the entire electrophoretic display device.

As described in this embodiment, electrophoretic particles each containing a plurality of pigment particles coated with the polymeric material (A) described above as the coating material and enclosed with the polymeric material (B) described above as the binder resin, are prepared and the charge control agent is contained in the dispersion medium for dispersing therein the electrophoretic particles. As a result, electric charging of the electrophoretic particles is stabilized and the electrophoretic particles are quickly moved immediately after voltage application and are moved stably for a long time.

Hereinbelow, the electrophoretic display device of the present invention will be described more specifically based on Examples using the horizontal movement type electrophoretic display device.

EXAMPLE 1

In this example, an electrophoretic display device shown in FIG. 4(e) was prepared through a production process shown in FIGS. 4(a) to 4(e).

As shown in FIG. 4(a), a 100 nm-thick second electrode 4b of aluminum was formed through vacuum (vapor) deposition on a 200 µm-thick substrate 3b of a polyimide (PI) film (50 nm×50 nm).

On the surface of the second electrode 4b, an insulating layer 6 of a polyurethane layer colored white by containing fine particles of titanium oxide was formed.

On the surface of the insulating layer 6, as shown in FIG. 4(b), a first electrode 4a was formed so as to overlap the second electrode 4b in a part of one pixel area, and then a transparent resin layer 9 of a polyacrylate ("OPTMER SS6699", mfd. by JSR K.K.) was formed so as to cover the first electrode 4a. The first electrode 4a was formed in a 50 nm-thick film of dark black titanium oxide and line-patterned through photolithography and dry etching so as to provide a line width of 35 µm.

Thereafter, as shown in FIG. 4(c), on the surface of the insulating layer 6, a partition wall 5 was formed so as to partition adjacent pixels. More specifically, a photosensitive resin ("SV 8", mfd. by Nippon Macdermid K.K.) was applied and exposed to light, followed by wet development to form the partition wall 5 having a height of 30 µm, a width of 12 µm and a spacing (between adjacent partition wall portions) of 120 µm. Thereafter, on an upper surface of the partition wall 5 (i.e., a contacting surface to be bonded to a substrate 3a), a thermal adhesive layer 8 was formed.

Then, 15 wt. parts of inorganic pigment particles of carbon black (referred to as "CB", average particle size: 30 nm) coated with a 10 nm-thick polymeric material (A) of polycarbonate and 85 wt. parts of a polymeric material (B) of polystyrene were used to form electrophoretic particles of polymer particles (average particle size of 2.5 µm). Each electrophoretic particle contained about 15000-25000 inorganic pigment materials.

1 wt. parts of the thus prepared electrophoretic particles, 100 wt. parts of a dispersion medium of an aliphatic hydrocarbon solvent ("Isoper H", mfd. by Exxon Corp.) and 0.01 wt. part of a charge control agent of zirconium octenate ("Nikkaoctics Zirconium", mfd. by Nippon Kagaku Sangyo K.K.) were mixed, followed by stirring for 1 hour to prepare a dispersion liquid for electrophoretic display. The thus prepared dispersion liquid was filled in a spacing between adjacent partition wall portions 5 (FIG. 4(c)).

Incidentally, the average particle size of the electrophoretic particles and the thickness of the polymeric material (A) coated on the outermost surfaces of inorganic polymeric materials were measured as an average of 20 samples by using a scanning electron microscope.

After positional alignment of a 100 µm-thick substrate 3a of polycarbonate film with the adhesive layer 8 was performed (FIG. 4(d)), the substrate 3a was adhered onto the partition wall 5 (end portion supporting member) under heating to prepare an electrophoretic display device according to the present invention (FIG. 4(e)).

The thus prepared electrophoretic display device was visually identified as black in an upper are of the first electrode 4a and as white of the color of the insulating layer 6 in an upper area of a region where the first electrode 4a was not disposed.

The electrophoretic display device was supplied for 3 hours with rectangular voltage of ±20 V at a frequency of 0.5 Hz.

As a result of observation of migration state of the electrophoretic particles immediately after the voltage application and after the continuous voltage application for 3 hours, the electrophoretic particles were positively charged and quickly moved between the electrodes 4a and 4b from immediately after the voltage application, thus realizing a high contrast (black/white) display from immediately after voltage application.

The display mode of the electrophoretic display device of the present invention will be described more specifically. The positively charged electrophoretic particles 1 are quickly moved on an electrode of negative polarity. For example, in the case where the second electrode 4b has a positive polarity and the first electrode 4a has a negative polarity, the electrophoretic particles 1 are moved to cover the first electrode 4a. When the electrophoretic display device is viewed from the viewer side through the substrate 3a, the black electrophoretic particle 1 on the first electrode 4a and the white area (other than the area of the first electrode 4a) are recognized. At the pixel, white display is effected as shown in FIG. 1(a).

On the other hand, in the case where the second electrode 4b has a negative polarity and the first electrode 4a has a positive polarity, the electrophoretic particles are moved to the white area (other than the area of the first electrode 4a). When the electrophoretic display device is viewed from the viewer side through the substrate 3a, the black first electrode 4a and the black electrophoretic particles covering the white insulating layer 6 are recognized. At the pixel, black display is effected as shown in FIG. 1(b).

EXAMPLES 2-6

Electrophoretic display devices were prepared in the same manner as in Example 1 except that some conditions are changed as shown in Table 1, respectively.

EXAMPLE 7

An electrophoretic display device was prepared in the same manner as in Example 2 except that electrophoretic particles of polymerization particle (average particle size: 5 µm) were prepared by using 50 wt. parts of inorganic pigment particles of titanium oxide ($TiO_2$, average particle size: 200 nm) coated with a 20 nm-thick polymeric material (A) of polycarbonate film and 50 wt. parts of polymeric material (B) of polymethyl methacrylate (PMMA).

COMPARATIVE EXAMPLE 1

An electrophoretic display device was prepared in the same manner as in Example 1 except that a dispersion liquid for electrophoretic display containing no charge control agent in a dispersion medium.

COMPARATIVE EXAMPLE 2

An electrophoretic display device was prepared in the same manner as in Example 2 except that the inorganic pigment particles (CB) which were not coated with the polymeric material (A) were used.

COMPARATIVE EXAMPLE 3

An electrophoretic display device was prepared in the same manner as in Comparative Example 2 except that the polymeric material (B) was changed to PMMA.

COMPARATIVE EXAMPLE 4

An electrophoretic display device was prepared in the same manner as in Example 2 except that the polymeric material (B) was not used (i.e., the inorganic pigment particles (CB) coated with the polymeric material (A) are used alone as the electrophoretic particles).

Conditions for preparing the electrophoretic display devices of Examples 1-7 and Comparative Examples 1-4 are shown in Table 1, and evaluation results of these Examples and Comparative Examples are shown in Table 2.

TABLE 1

| | IPPS*1 (nm) | Polymer (A)*2 | Thickness (nm) | (B) | CSPS*3 (μm) | Liquid*4 component/wt. parts |
|---|---|---|---|---|---|---|
| Ex. 1 | 30 | PC | 10 | PS | 2.5 | Oct-Zr/0.01 |
| Ex. 2 | 30 | PC | 10 | PS | 2.5 | Oct-Zr/0.1 Neotall125H/ 2.5 Asaprene1250/ 0.8 |
| Ex. 3 | 30 | PC | 10 | PS | 1.5 | Same as Ex. 2 |
| Ex. 4 | 80 | PMMA | 5 | PS | 1.5 | Same as Ex. 2 |
| Ex. 5 | 30 | PC | 10 | PMMA | 1.5 | Same as Ex. 2 |
| Ex. 6 | 30 | PC | 10 | PS/PMMA = 70/30 (wt. parts) | 1.5 | Same as Ex. 2 |
| Ex. 7 | 200 | PC | 20 | PMMA | 5 | Same as Ex. 2 |
| Comp. Ex. 1 | 30 | PC | 10 | PS | 2.5 | Not used |
| Comp. Ex. 2 | 30 | Not used | — | PS | 2.5 | Same as Ex. 2 |
| Comp. Ex. 3 | 30 | Not used | — | PMMA | 2.5 | Same as Ex. 2 |
| Comp. Ex. 4 | 30 | PC | 10 | Not used | — | Same as Ex. 2 |

*1IPPA: inorganic pigment particle size (nm)
*2PC: polycarbonate PS: polystyrene PMMA: polymethyl methacrylate PS/PMMA: styrene-methyl methacrylate copolymer
*3CPPS: charged particle particle size (μm)
*4Oct-Zr: zirconium octenate ("Nikkaoctics Zirconium", mfd. by Nippon Kagaku Sangyo K.K.) Neotall 125H: rosin ester (mfd. by Harima Kasei K.K.) Asaprene 1205: styrene-butadiene copolymer (mfd. by Asahi Kasei K.K.)

TABLE 2

| | Immediately after voltage application | | After 3 hours | |
|---|---|---|---|---|
| | Charge polarity *1) | Uniformization time *2) | Charge polarity *1) | Migration state |
| Ex. 1 | (+) | 10 sec | (+) | Good |
| Ex. 2 | (+) | 10 sec | (+) | Good |
| Ex. 3 | (+) | 10 sec | (+) | Good |
| Ex. 4 | (+) | 10 sec | (+) | Good |
| Ex. 5 | (+) | 10 sec | (+) | Good |
| Ex. 6 | (+) | 10 sec | (+) | Good |
| Ex. 7 | (+) | 10 sec | (+) | Good |
| Comp. Ex. 1 | Not moved. | | Not moved. | |
| Comp. Ex. 2 | (−) | 1 min. | Negative | Good |
| Comp. Ex. 3 | Irregularity migration *3) | | Adhered to electrode and not moved. | |
| Comp. Ex. 4 | Adhered to electrode. | | Not evaluated. | |

*1): Charge polarity of electrophoretic particles. (+) positive, (−) negative
*2): Time required for uniformizing migration state of electrophoretic particles.
*3): Electrophoretic particles of both polarities were copresent and were moved irregularity.

INDUSTRIAL APPLICABILITY

According to the present invention, it is possible to provide an electrophoretic display device capable of stabilizing a charging state of electrophoretic particles and retaining a high contrast image state immediately after voltage application.

The invention claimed is:

1. An electrophoretic device comprising:
a substrate,
an electrode formed on a surface of said substrate, and
a liquid which contains charged particles and is held on said substrate; each of the charged particles comprising pigment particles, a coating material for coating the pigment particles, and a resinous material containing a plurality of pigment particles coated with the coating material,
wherein said liquid contains a charge control agent for electrically charging the resinous material and wherein the coating material is a polymer comprising at least one species of polymer or copolymer selected from the group consisting of a polystyrene, a poly(meth)acrylate, a polycarbonate, a styrene-(meth)acrylate copolymer, and a polyolefin.

2. An electrophoretic display device, comprising:
a substrate,
an electrode formed on a surface of said substrate, and
a liquid which contains charged particles and is held on said substrate, each of the charged particles comprising pigment particles, a coating material for coating the pigment particles, and a resinous material containing a plurality of pigment particles coated with the coating material,
wherein said liquid contains a metallic soap as a charge control agent for electrically charging the resinous material.

3. An electrophoretic display device, comprising:
a substrate,
an electrode formed on a surface of said substrate, and a liquid which contains charged particles and is held on said substrate; each of the charged particles comprising pigment particles, a coating material for coating the pigment particles, and a resinous material containing a plurality of pigment particles coated with the coating material, wherein said liquid contains a charge control agent for electrically charging the resinous material and wherein the pigment particles are particles of carbon black or titanium oxide.

4. An electrophoretic display device, comprising:

a substrate, an electrode formed on a surface of said substrate, and a liquid which contains charged particles and is held on said substrate; each of the charged particles comprising pigment particles, a coating material for coating the pigment particles, and a resinous material containing a plurality of pigment particles coated with the coating material, wherein said liquid contains a charge control agent for electrically charging the resinous material and wherein the resinous material is any one of a polystyrene, a poly(meth)acrylate or a styrene-(meth)acrylate copolymer.

5. An electrophoretic display device, comprising:

a substrate, an electrode formed on a surface of said substrate, and a liquid which contains charged particles and is held on said substrate; each of the charged particles comprising pigment particles, a coating material for coating the pigment particles, and a resinous material containing a plurality of pigment particles coated with the coating material, wherein said liquid contains a charge control agent for electrically charging the resinous material and wherein the charged particles have an average particle size of not less than 0.1 µm and not more than 7 µm.

6. An electrophoretic display device, comprising:

a substrate, an electrode formed on a surface of said substrate, and a liquid which contains charged particles and is held on said substrate; each of the charged particles comprising pigment particles, a coating material for coating the pigment particles, and a resinous material containing a plurality of pigment particles coated with the coating material, wherein said liquid contains (i) a charge control agent for electrically charging the resinous material and (ii) a rosin ester or a rosin derivative.

7. An electrophoretic display device, comprising:

a substrate, an electrode formed on a surface of said substrate, and a liquid which contains charged particles and is held on said substrate; each of the charged particles comprising pigment particles, a coating material for coating the pigment particles, and a resinous material containing a plurality of pigment particles coated with the coating material, wherein said liquid contains a charge control agent for electrically charging the resinous material and a styrene-butadiene copolymer.

* * * * *